Feb. 29, 1944.    G. K. NEWELL    2,342,750
BRAKE MECHANISM
Filed Dec. 30, 1941

INVENTOR
George K. Newell
BY
ATTORNEY

Patented Feb. 29, 1944

2,342,750

UNITED STATES PATENT OFFICE 2,342,750

BRAKE MECHANISM

George K. Newell, near Pitcairn, Pa., assignor to The Westinghouse Air Brake Company, Wilmerding, Pa., a corporation of Pennsylvania Application December 30, 1941, Serial No. 424,855

7 Claims. (Cl. 188—153)

This invention relates to brake mechanism and more particularly to the disk type for braking a rotatable member such as a wheel or wheels of a railway vehicle.

One object of the invention is the provision of a relatively simple and compact brake mechanism of the above type.

Another object of the invention is the provision of a relatively simple and compact spring applied and air pressure released disk brake mechanism.

Another object of the invention is the provision of an improved disk brake mechanism embodying means operative by fluid pressure for actuating the mechanism to apply the brakes and also embodying spring means which are normally rendered non-operative by pressure of fluid and which are operative upon the relief of such pressure to also apply the brakes.

Another object of the invention is the provision of an improved disk brake mechanism in which all braking control means for the braking disks are disposed at one end of the pile of disks and operatively connected thereto without the use of levers, stuffing boxes, etc.

Another object of the invention is the provision of an improved disk brake mechanism as defined in the foregoing objects for use in the limited space existing between a wheel and a journal box of certain railway vehicles.

More specifically the invention consists in the addition of spring applying, air pressure releasing means to a relatively simple and compact disk brake mechanism of the general type disclosed in my copending application Serial No. 348,631, filed July 31, 1940, now Patent No. 2,322,049, dated June 15, 1943, and in which all of the brake application control means are located at one end of the pile of braking disks and operatively connected thereto without the use of levers, stuffing boxes, etc.

Other objects and advantages will be apparent from the following more detailed description of the invention.

Description

Figure 1:
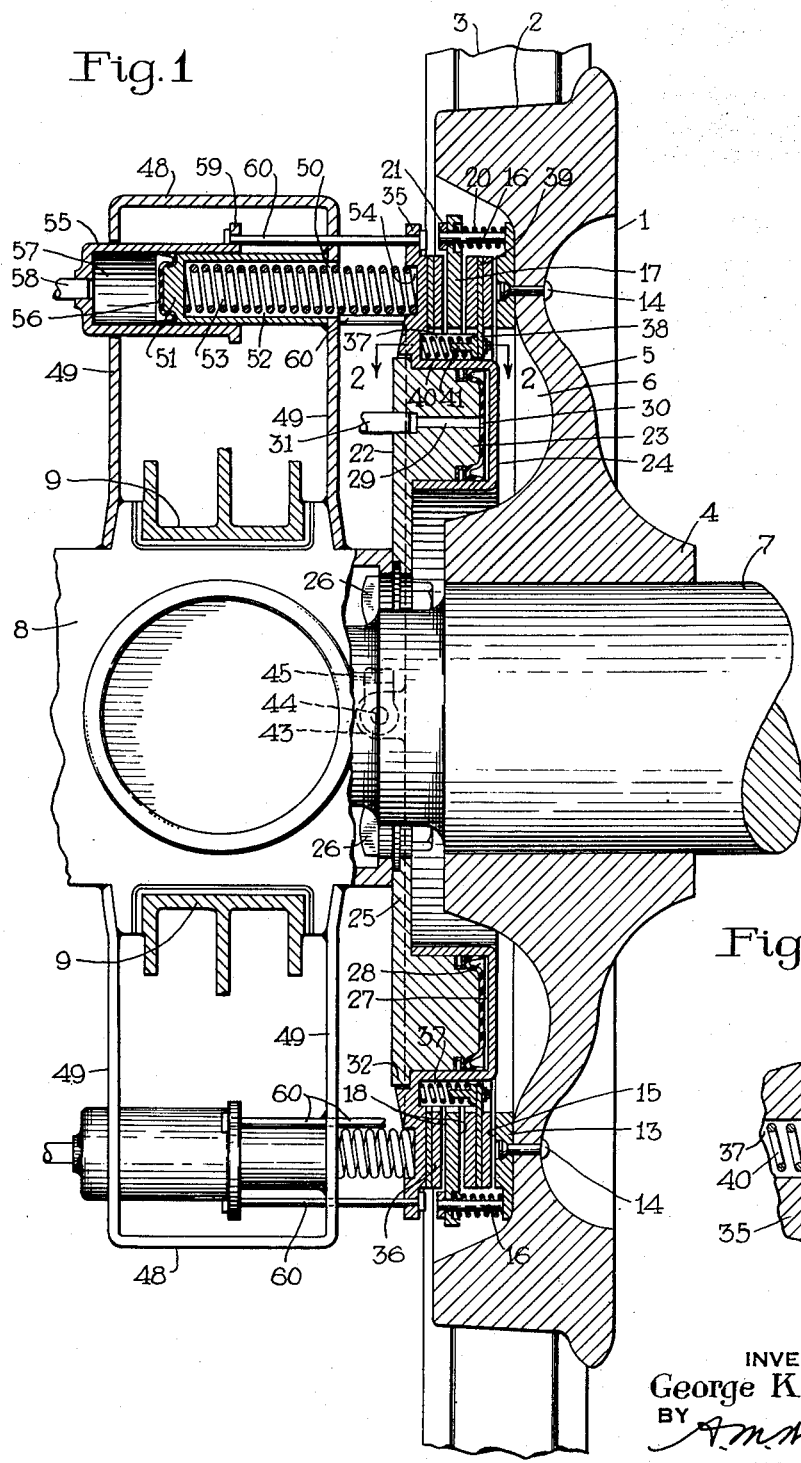
Figure 2:
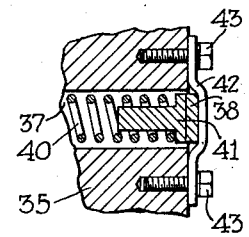

In the accompanying drawing Fig. 1 is a horizontal sectional view taken through the improved brake mechanism and through a wheel at one end and one side of a railway type vehicle truck with which said mechanism is associated for the purpose of illustration; and Fig. 2 is a sectional view taken on the line 2—2 in Fig. 1.

As shown in the drawing, the reference numeral 1 indicates a wheel of a railway vehicle truck, which wheel comprises the usual tread 2 for rolling on a track rail 3, a hub 4, and an annular web 5 connecting the tread 2 and hub 4 and so arranged as to provide in the outer face of the wheel an annular cavity 6 between the tread 2 and hub 4 in which the major portion of the improved disk brake mechanism is adapted to be mounted, as will be later described.

An axle 7 is mounted in the hub portion 4 of the wheel 1 and extends beyond the outer face thereof for carrying a journal box 8. A truck side frame (not shown) is adapted to extend over the journal box 8 and to be provided with the usual depending pedestal legs 9 which are spaced apart and slidably mounted in slots provided in the opposite sides of the journal box, as shown in the drawing, for holding the journal box against rotation with the axle 7 and which provides for vertical movement of the side frame and pedestal legs relative to the journal box. Railroad vehicle truck structures of this type are so well known that a more detailed showing and description thereof are not deemed essential to a clear understanding of the invention.

Associated with the above described truck structure is a disk brake mechanism comprising an annular ring-like rotatable brake element or rotor 13 disposed in the cavity 6 formed in the outer face of wheel 1 in concentric relation with the wheel. The end face of the brake element 13 adjacent the wheel web 5 is shaped to engage said web and is rigidly secured thereto by a plurality of rivets 14 which are spaced from each other around the rotor and adapted to cause said rotor to turn with the wheel 1. On the opposite end of rotor 13 is an annular braking face 15 arranged at right angles to the axis of the wheel.

Beyond the periphery of braking face 15 the rotor 13 is provided with a plurality of fingers 16 equally spaced apart and extending in a direction away from the outer face of the wheel parallel to the axis thereof. The fingers 16 extend through aligned bores provided in an annular ring-like rotatable brake element or rotor 17 which has on each of its opposite ends an annular braking face 18 aligned with the braking face 15 on rotor 13. The fingers 16 support the rotor 17 and are adapted to turn said rotor with the rotor 13 and thereby the wheel 1. A coil spring 20 is mounted on each finger 16 with one end engaging the rotor 13 and the opposite end engaging rotor 17. These springs are under compression and therefore adapted to urge the rotor 17 away from the rotor 13 to a brake release position defined by contact with a washer 21 secured to the end of each finger 16.

The brake rotor 17 encircles a concentrically arranged annular brake cylinder device 22 the outside diameter of which is somewhat less than the inside diameter of said rotor.

The brake cylinder device 22 comprises an annular movable part and an annular stationary part carrying the movable part, the stationary part in the present embodiment being in the form of an annular piston 23 while the movable part constitutes a casing 24 which is carried by the piston 23 and mounted to slide thereon in the direction toward and away from the wheel 1.

The annular piston 23 is provided with an inwardly extending annular flange 25 which encircles the axle 7 and engages the inboard end of journal box 8 to which it is rigidly secured by a plurality of bolts 26. The piston 23 extends into an annular bore provided in the casing 24 and has at its inner end an annular packing cup 27 having sliding contact with the cylindrical walls of said bore and cooperating with the closed end of the bore to provide a pressure chamber 28. The piston 23 has a passage 29 which at one end registers with an aperture 30 provided through the packing cup 27 to connect said passage to the pressure chamber 28. The other end of passage 29 is connected to a pipe 31 through which fluid under pressure is adapted to be supplied to and vented from the pressure chamber 28.

The brake cylinder casing 24 is shown on the piston 23 in its brake release position in which the packing cup 23 is spaced slightly from the closed end of pressure chamber 28, and this position may be defined by engagement between the inner cylinder wall of casing 24 with the piston flange 25 and by engagement of the outer cylinder wall with an annular flange 32 provided around the outside of the piston in concentric relation with the flange 25.

Extending outwardly from the outer cylinder wall of the brake cylinder casing 24, adjacent the annular piston flange 32, is an annular flange 35 which is preferably formed integral with said casing. Secured to the face of this flange adjacent the wheel 1 is an annular non-rotatable brake element or stator 36 having the same inside and outside diameters as the braking faces 15 and 18 on rotors 13 and 17 and arranged in coaxial relation with said faces, the inner face of the stator 36 being arranged for frictional braking contact with the adjacent face of rotor 17.

The brake cylinder casing 24 is provided around its outer periphery adjacent the inner face of flange 35 with a plurality of slots 37 which are open at the end adjacent the wheel and closed at the opposite end. These slots extend parallel to the axis of the brake cylinder casing and are provided to receive inwardly extending fingers 38 of a non-rotatable brake element or stator 39 which is disposed between the rotors 13 and 17 and which encircles the brake cylinder casing. The stator 39 is arranged in coaxial relation with the rotors 13 and 17 and stator 36 and its opposite end faces are arranged for frictional braking contact with the adjacent faces of said rotors.

In each slot 37 is a coil spring 40 bearing at one end against the closed end of the slot and at the opposite end on a seating member 41 secured to the aligned finger 38 projecting from the stator 39. These springs are under compression and therefore act on stator 39 for urging same to its brake release position shown, and said springs also provide for movement of the brake cylinder casing 24 relative to said stator as will be later brought out. The release position of the stator 39 with respect to the brake cylinder casing 24 is defined by contact of each finger 38 with a strap 42 (Fig. 2) which extends across the open end of the respective slot 37 and is secured by cap screws 43 to the brake cylinder casing at either side of said slot.

Below the axle 7 the flange 35 projecting from the brake cylinder casing 24 is provided with an outwardly extending lug 43 to which is secured by a bolt 44 one end of a torque rod 45. The opposite end of this rod may be connected with any suitable relatively stationary part of a vehicle truck, such as the side frame, so as to act to hold the brake cylinder casing 24 and the stator elements 36 and 39 against rotation.

The brake mechanism so far described is substantially the same as disclosed in my aforementioned pending application.

According to the invention, I provide around the journal box 8 a plurality of U-shaped brackets 48 having legs 49 the ends of which are secured to said box in any suitable manner, as by welding. Only two such brackets are shown in the drawing, one at each of the opposite sides of the journal box straddling the pedestal legs 9.

Through the leg 49 adjacent the wheel 1 in each bracket is a bore 50 having its axis at right angles to the braking faces of the rotors and stators and aligned with said faces substantially midway between the inner and outer peripheries thereof. A piston 51 is disposed between the legs 49 of each bracket and has one end rigidly secured, as by welding, to the inner leg 49 over the bore 50 therein. Each piston 51 has a bore 52 aligned with and open at one end to the bore 50 in the bracket leg and closed at the opposite end. One end of a coil spring 53 is disposed in the bore 52 in each piston 51 and bears against the closed end of said bore, while the opposite end of the spring is supported in a recess 54 provided in the outer face of stator 35 in alignment with the bore 50.

A cylinder 55 loosely extending through a suitable bore in the outer leg 49 of each bracket is slidably mounted on each of the pistons 51. The closed or outer end of each piston is provided with a packing cup 56 which cooperates with the respective cylinder 55 to form a pressure chamber 57 between the closed end of the piston 51 and the closed end of the cylinder 55. The pressure chamber 57 is connected to a pipe 58 through which fluid under pressure is adapted to be supplied to and released from said chamber, as will be later brought out.

Each cylinder 55 is provided with an annular flange 59 around the open end thereof and this flange is connected to the brake cylinder casing flange 35 which carries the brake stator 36 by one or more tension struts 60 which are adapted to move the brake cylinder casing 24 and casing flange 35 to their brake release positions shown, upon outward movement of the several cylinders 55.

The several springs 53 are assembled between the pistons 51 and brake cylinder flange 35 under pressure sufficient to effect operation of the brake to brake the wheel 1 in an emergency or the like, as will later be brought out. The several pipes 58 connected to pressure chambers 57 in the cylinders 55 may therefore be connected to an emergency pipe, a safety control pipe or the like from which fluid under pressure is adapted to be vented only in case of emergency to attain an application of brakes. The pressure chambers 57 are therefore normally adapted to be charged with fluid under pressure supplied through the pipes 58 and the degree of pressure thus provided in said chambers is intended to be only sufficient to overcome the pressure of springs 52 and cause movement of the cylinders 55 and thereby the brake cylinder casing 24, flange 35 thereof and the brake stator 36 carried by said flange to their brake release positions shown in the drawing, and defined by contact of the casing 24 with the flanges 25 and 32 of the brake cylinder piston 23.

When the brake cylinder casing 24 and stator 36 are in their release positions just described, the stator 39 is adapted to be held against the straps 42 by springs 40 and thereby in its release position with respect to the stator 36. Under this condition the several springs 20 are adapted to hold the rotor 17 in contact with the washers 21 and thereby in its release position, substantially midway between the stators 36 and 39. With the several parts of the brake mechanism thus in their release positions, the brake rotors 13 and 17 are out of contact with the brake stators 36 and 39 so that the rotors are free to turn with the wheel 1.

The application and release of brakes on wheel 1 is normally adapted to be controlled by the brake cylinder device 22 with the pressure chambers 57 in the several cylinders 55 maintained charged with fluid at a pressure such as above mentioned.

To effect a service application of brakes with the several cylinders 55 charged with fluid pressure, fluid under pressure is supplied in any desired manner to the pipe 31 and thence to pressure chamber 28 in the brake cylinder device 22, and when this pressure acting on the brake cylinder casing 24 is increased to a degree which slightly exceeds the opposing relatively small pressure differential between the force of springs 53 and the pressure of fluid acting in chambers 57 on cylinders 55, the brake cylinder casing 24 is moved in the direction of the wheel 1, it being noted that due to struts 60, the cylinders 55 move with the brake cylinder casing.

As the brake cylinder casing 24 is thus moved toward wheel 1 the stators 36 and 39 move therewith and into contact with the rotors 17 and 13, respectively. After the stators 36 and 39 thus contact the rotors 17 and 13, respectively, further movement of the brake cylinder casing 24 under the influence of fluid pressure in pressure chamber 28 is relative to the stator 39 and causes movement of the rotor 17 against springs 20 in the direction of stator 39 and finally into contact therewith. When the rotor 17 thus attains contact with the stator 39 all of the several brake elements are in contact, so that any further increase in pressure in chamber 28 on the brake cylinder casing 24 will then squeeze the several brake elements together to create a drag on the rotors 17 and 13 and thereby effect braking of the wheel 1. The degree of braking thus attained on the wheel 1 is dependent upon the pressure of fluid in pressure chamber 28 of the brake cylinder device, and this pressure may be varied in the usual manner to provide any desired degree of braking of wheel 1.

In order to release an application of the brakes effected in the manner just described, fluid under pressure is vented from the pressure chamber 28 in the brake cylinder device 22 by way of pipe 31, and when this pressure becomes reduced to a degree less than the differential between the force of springs 53 and the pressure of fluid acting in chambers 57 on the cylinders 55, said differential applied through struts 60 to flange 35 of the brake cylinder casing 24 is adapted to return said casing flange and thereby the stator element 36 to their release positions, defined by contact between the brake cylinder casing and the flanges 25 and 32 projecting from the brake cylinder piston 22. As the stator 36 is thus returned to its release position, the springs 20 are rendered effective to return the rotor 17 to its release position, while springs 40 hold the stator 39 in contact with rotor 13 until the fingers 38 projecting from stator 39 are engaged by straps 42, which then act to pull the stator 39 to its release position during the remainder of movement of the brake cylinder casing 24 to its release position. With the several brake elements thus returned to their release positions, the rotors 13 and 17 are again free to turn with the wheel 1.

If for any reason the fluid pressure is released from pressure chambers 57 in the cylinders 55, such release renders the several springs 53 effective through the stator 36 to urge the several brake elements into frictional interengagement in the same manner as attained by operation of the brake cylinder casing 24, to thereby effect braking of wheel 1 to a degree dependent upon the force of the springs against the stator element 36.

To release an application of brakes effected by the springs 53 it is necessary to supply fluid to chambers 57 in cylinders 55 at the required pressure for effecting movement of the cylinders 55 away from the pistons 51 against the force of springs 53, to their normal release positions shown. This movement of the cylinders 55 acts through the struts 60 to pull the flange 35 projecting from the brake cylinder casing 24 and thereby the stator 36 to their release positions shown, and thereby permit movement of the rotor 17 and stator 39 to their release positions, as before described.

It will thus be seen that the brake stators and rotors may be actuated to brake the wheel 1 either by operation of the brake cylinder casing 24 under the pressure of fluid supplied to pressure chamber 28, or by springs 53 upon the venting of fluid under pressure from pressure chambers 57 in the cylinders 55.

If it is desired to attain a greater degree of braking than possible by operation only of the brake cylinder device 22 or of the springs 53, the fluid under pressure may be vented from the pressure chambers 57 in cylinders 55 at the same time as fluid under pressure is supplied to pipe 31 for actuating the brake cylinder device 22, as will be apparent.

A failure of the fluid pressure supply on a vehicle will result in loss of fluid under pressure from pressure chambers 57 in the cylinders 55 and such loss will automatically render the springs 53 effective to apply the brakes on wheel 1 so as to insure the safety of the vehicle, under such a condition. It will also be noted that if for any reason, there is no fluid pressure on the vehicle the springs 53 will be effective to maintain the brake mechanism in its brake application position to hold the vehicle stopped for as long as desired.

Summary

It will now be seen that the improved brake mechanism is relatively simple, compact, and adapted to be applied to a relatively small space such as exists on certain railway vehicle trucks between the journal box 8 and the truck wheels, with the major portion of the brake mechanism disposed within the wheel itself. On these trucks at either side of a pair of pedestal legs straddling the journal box there is usually sufficient unused space for the application of the springs 53 for actuating the brake mechanism and the fluid pressure release means for the springs and it should be noted that both said springs and fluid pressure means are so arranged as to operate as desired without the use of stuffing boxes, levers, or the like.

Having now described my invention, what I claim as new and desire to secure by Letters Patent is:

1. A disk brake mechanism for a wheel of a railway vehicle truck comprising in combination with said wheel, an axle carried by said wheel, a journal box carried by said axle at one side of said wheel, truck frame pedestal legs slidably mounted in opposite sides of said journal box, an annular brake rotor disposed between said wheel and journal box in coaxial relation with said wheel and secured to rotate therewith, an annular brake stator disposed between said rotor and journal box in coaxial relation with said rotor and adapted to be moved axially into frictional braking contact with said rotor to brake said wheel, support means carried by opposite sides of said journal box beyond said pedestal legs, coil spring means under pressure carried by each of said support means and bearing against said stator for effecting movement thereof into braking contact with said rotor, fluid pressure controlled cylinder means associated with each of said support means and comprising a stationary part secured to said support means and a movable part slidably mounted on said stationary part and cooperating therewith to form a pressure chamber adapted to receive fluid under pressure for moving said movable part in a direction away from said wheel, and means connecting said movable part of said cylinder means to said stator and operative by pressure of fluid supplied to said pressure chamber and acting on said movable part to move said stator out of contact with said rotor against said spring means, said spring means being operative to move said stator into braking contact with said rotor upon release of fluid under pressure from said chamber in both said cylinder means.

2. A disk brake mechanism comprising in combination a pile of coaxially arranged brake elements including a brake rotor, and a brake stator adapted to be moved axially into frictional braking engagement with said rotor to brake same, a brake cylinder comprising a movable member connected with said stator and adapted to be operated by fluid pressure to move said stator into braking contact with said rotor, spring means under pressure constantly acting on said stator for urging same in the direction of said rotor into braking contact therewith, and fluid pressure cylinder means comprising a fixed part supporting said spring means for rendering same effective and a movable part carried by said fixed part and adapted to be urged by fluid pressure in a direction away from said stator, and means connecting said movable part to said stator for rendering the pressure of fluid on said movable part effective to counteract the pressure of said spring means on said stator.

3. A disk brake mechanism for a wheel of a railway vehicle truck comprising in combination with said wheel, an axle carried by said wheel, a journal box carried by said axle at one side of said wheel, an annular brake rotor disposed between said wheel and journal box in coaxial relation with said wheel and secured to said wheel for rotation therewith, an annular brake stator disposed between said rotor and journal box in coaxial relation with said rotor and adapted to be moved into frictional braking engagement with said rotor to brake said wheel, brake cylinder means comprising a fixed member carried by said journal box and a movable member carried by said fixed member and connected with said stator, said two members cooperating to form a pressure chamber, fluid pressure control cylinder means comprising a stationary part carried by said journal box and a movable part carried by said stationary part and so arranged as to move in a direction away from said wheel upon supply of fluid under pressure to a control chamber formed between the two parts, coil spring means interposed between and bearing at opposite ends on said fixed part and on said stator, said spring means being under pressure for urging said stator into contact with said rotor to brake said wheel, and means connecting said movable part to said stator for pulling said stator out of contact with said rotor against said spring means upon movement of said movable part by fluid pressure in said control chamber and providing for movement of said stator into contact with said rotor by said spring means upon release of fluid pressure from said control chamber, said movable member being operative to effect movement of said stator into contact with said rotor upon an increase in pressure in said pressure chamber which exceeds the difference between the force of said coil spring means and the opposing force of the fluid pressure acting on said movable part, and said difference in forces being operative upon release of fluid pressure on said movable brake cylinder member to effect movement of said stator out of braking engagement with said rotor.

4. A disk brake mechanism for a wheel of a railway vehicle truck comprising in combination with said wheel, an axle carried by said wheel, a journal box carried by said axle at one side of said wheel, an annular brake rotor disposed between said wheel and journal box in coaxial relation with said wheel and secured thereto for rotation therewith, an annular brake stator disposed between said rotor and journal box in coaxial relation with said rotor and adapted to be moved axially into engagement with said rotor to effect braking of said wheel and in the opposite direction out of braking contact with said rotor, an annular brake cylinder device arranged in concentric relation with said stator and comprising a fixed member secured to and carried by said journal box, a movable member carried by said fixed member and connected with said stator and cooperative with said fixed member to form a pressure chamber for receiving fluid under pressure to effect movement of said movable member and thereby of said stator in the direction of said rotor to obtain frictional braking contact between said stator and rotor, said movable member and stator being capable of movement in the opposite direction upon release of fluid under pressure from said brake cylinder pressure chamber, a plurality of fluid pressure cylinder means spaced from each other around said journal box and each comprising a fixed part and a movable part carried by said fixed part and cooperative therewith to form a control chamber for receiving fluid under pressure, said cylinder means being so arranged that the movable parts are adapted to move in a direction away from said wheel upon supply of fluid under pressure to the control chambers and in the opposite direction upon the release of such fluid pressure, a coil spring interposed under compression between each of said fixed parts of said cylinder means and said stator and operative on said stator for urging same in the direction of and into contact with said rotor for braking said wheel, and means connecting said movable parts of said cylinder means to said stator for rendering said movable parts operative under pressure of fluid in said control chambers to counteract the pressure of said springs on said stator and to move said stator out of contact with said rotor, and providing for movement of said stator into braking engagement with said rotor by said springs upon release of fluid under pressure from said control chambers.

5. A disk brake mechanism for a wheel of a railway vehicle truck having an axle carried by said wheel and a journal box carried by said axle, said mechanism comprising in combination with said journal box, an annular brake stator carried by said journal box and movable axially in one direction to brake said wheel and in the opposite direction to release the brake on said wheel, a brake cylinder means carried by said journal box and comprising a movable member connected to said stator and adapted to be moved by fluid under pressure to move said stator in said one direction to brake said wheel and providing for movement of said stator in said opposite direction upon release of fluid under pressure on said movable member, a control cylinder means carried by said journal box and comprising a movable part connected to said stator and adapted to be moved by fluid under pressure in a direction, opposite the direction of movement of said movable member when moved by fluid under pressure, for moving said stator in its said opposite direction, and spring means carried by said journal box and bearing against said stator, said spring means being under pressure for urging said stator in said one direction, said movable part of said control cylinder means when subject to the pressure of fluid being adapted to counteract the pressure of said spring means on said stator and being operative to move said stator in its said opposite direction upon release of fluid under pressure on said movable member of said brake cylinder means, said spring means being rendered effective upon release of fluid under pressure on said movable part of said control cylinder means to move said stator in its said one direction.

6. A disk brake mechanism for a wheel of a railway vehicle truck having an axle carried by said wheel and a journal box mounted on said axle comprising an annular brake rotor secured to turn with said wheel, an annular brake stator arranged for axial movement into frictional contact with said rotor to brake said wheel, annular brake cylinder means operable by fluid under pressure to move said stator into contact with said rotor, said rotor, stator and brake cylinder means being disposed between said wheel and journal box in coaxial relation with said wheel, spring means under pressure supported by said journal box and bearing against said stator for urging same into frictional contact with said rotor, and piston means connected to said stator and carried by said journal box and operative by fluid pressure to move said stator out of contact with said rotor against said spring means with the fluid under pressure released from said brake cylinder means.

7. A disk brake mechanism for a wheel of a railway vehicle truck having an axle carried by said wheel and a journal box mounted on said axle comprising an annular brake rotor secured to turn with said wheel, an annular brake stator arranged for axial movement into frictional contact with said rotor to brake said wheel, annular brake cylinder means operable by fluid under pressure to move said stator into contact with said rotor, said rotor, stator and brake cylinder means being disposed between said wheel and journal box in coaxial relation with said wheel, a plurality of coil springs equally spaced from each other around said journal box, means associated with said journal box supporting one end of said springs, said springs being under pressure with their opposite ends acting on said stator and being operative to move said stator into frictional contact with said rotor, and piston means carried by said journal box and connected to said stator and operative by fluid under pressure to move said stator out of contact with said rotor against said spring means with fluid under pressure released from said brake cylinder means.

GEORGE K. NEWELL.